Patented July 19, 1938

2,123,934

UNITED STATES PATENT OFFICE 2,123,934

PRODUCTION AND TREATMENT OF ARTIFICIAL FILAMENTS, YARNS, FILMS, AND OTHER MATERIALS CONTAINING CELLULOSE DERIVATIVES

William Alexander Dickie and Percy Frederick Combe Sowter, Spondon, near Derby, England, assignors to Celanese Corporation of America, a corporation of Delaware No Drawing. Application May 31, 1934, Serial No. 728,316. In Great Britain June 27, 1933

9 Claims. (Cl. 18—54)

This invention relates to the production and treatment of filaments, threads, yarns, ribbons, films or other materials made of or containing cellulose acetate or other organic derivative of cellulose. This application is a continuation-in-part of U. S. application S. No. 402,785 filed October 26, 1929.

A number of processes have in the past been developed having as thier primary object the production of filaments, threads, ribbons, films or other materials of cellulose acetate or other organic derivative of cellulose of high tenacity or tearing strength. U. S. Patent No. 1,709,470 describes a treatment of fully set and finished cellulose acetate filaments with assisting agents and a simultaneous or subsequent stretching of the materials beyond their elastic limit. As suitable assisting agents acetone, ethyl alcohol, formaldehyde and glycerine are mentioned. Similarly British Patent No. 323,790 describes a stretching of the materials after or during treatment with an assisting agent, while the filaments, threads or the like are travelling from point to point. These processes result in a reduction of the denier of the filaments or other products and in an increase in their tensile strength. Again, in U. S. applications S. Nos. 402,785 filed 26th October, 1929 and 601,043 filed 24th March, 1932, processes are described for the production of filaments, threads, yarns, ribbons, films and the like by wet spinning processes in which during the wet coagulation of the products solvents for the cellulose ester or ether are present in high concentration, or as a modification the products immediately after the wet spinning process are carried directly into contact with a medium containing a solvent in high concentration. The high concentration of the solvent causes a high degree of plasticity of the cellulose ester or ether and permits of the filaments, threads or the like being drawn out to very fine deniers, and in addition the products thus drawn out may have a very high tensile strength exceeding that of natural silk.

The present invention is concerned with improvements in processes wherein artificial materials containing organic derivatives of cellulose are treated with softening media, and is particularly directed to the application in such processes of a particular type of solvent or other softening agent for the organic derivative of cellulose. According to the present invention in all such processes in which solvents or other softening agents are applied either during or subsequent to the production of the filaments, threads, yarns, ribbons, films or other materials the softening medium applied comprises an aliphatic compound containing one or more halogen atoms and one or more oxygen atoms. Preferably oxygen atoms are present in the aliphatic compounds in the form of polar groups, for example as alcoholic groups, ketonic groups or ester groups. Ether groups, as in dichlor diethyl ether, do not exhibit much polarity and are not so satisfactory for the purposes of the present invention. The best type of agent is one in which oxygen is present in the form of hydroxy groups. Preferably the aliphatic compound contains more than one halogen atom and it may contain one or more oxygen atom, present, as previously stated, in the form of a polar group or groups. Among suitable agents for the purpose of the present invention may be mentioned chlorinated ketones, for example dichlor-acetone, chlorinated esters, for example $\alpha\alpha$-dichlor-ethyl acetate, $\alpha\beta$-dichlorethyl acetate and chlor-ethyl chlor-acetate, and, as examples of the preferred type of agent containing the oxygen in the form of a hydroxy group, the chlorhydrins, for example ethylene chlorhydrin or better glycerine mono- and dichlorhydrins. The compounds which have been found of particular value according to the invention, however, are chloral hydrate, chloral alcoholate and chloretone.

The new type of solvent in processes of the character referred to may be used as the sole solvent present either, for instance, in a coagulating bath in a wet spinning process or in a treatment bath for the purpose of enabling stretch to be applied to the filaments either continuously with their production by dry or wet spinning processes or as a separate operation carried out upon the finished materials. Alternatively such a solvent may be employed in conjunction with other solvents, for example acetic acid, acetone, the ethers, esters and ether-esters of olefine and poly-olefine glycols including the cyclic ethers, for example glycol mono-acetate, methyl glycol mono-acetate, dioxane, methylene ethylene ether and the homologues and substitution products of these cyclic ethers, ethyl lactate, diethyl tartrate, diacetone alcohol and the like. The halogen-oxygen-containing solvent or other softening agent characteristic of the invention may be present in the treating medium in a relatively high proportion, or the types of solvents or other softening agents previously used may be employed as the main softening constituent of the treating medium, and the action of this softening agent may be modified with the aid of a relatively small proportion of the halogen-oxygen-containing solvent or other softening agent.

By means of the softening agents of the present invention artificial materials may be obtained which have a good tenacity and extension. In wet spinning, for example, better extension is obtainable by spinning an acetone solution of cellulose acetate into an aqueous solution of chloral hydrate and dioxane than by spinning into aqueous dioxane.

For obtaining the best results in stretching, whether applied to the finished materials or continuously with their production by dry or wet processes, or during the production of the materials by wet spinning processes, the softening power of the treating medium is preferably high and only slightly lower than that necessary to form an actual solution of the organic derivative of cellulose under treatment. Thus, in a wet spinning process the total softening power may be so high that the separate filaments or other materials, if allowed to contact with each other, would coalesce. Actually coalescence is prevented in the spinning bath and on emergence from the spinning bath by the amount of medium adhering to the separate filaments or other materials, but care has to be taken in the elimination of the treating medium that before or during the reduction of the quantity of liquid adhering to the materials suitable dilution is effected so as to prevent coalescence.

Preferably the halogen-oxygen-containing softening agents employed according to the present invention are somewhat soluble in water, or at least soluble in an aqueous solution of the other type of softening agent which may be contained in the bath so as to enable water to be used as the non-solvent diluent in the bath. However, the invention is not restricted to the employment of aqueous treating media, and other non-solvent diluents as for example hydrocarbons, chlorinated hydrocarbons having little or no softening action upon the cellulose derivative, ethers, alcohols and the like may be used.

In a wet spinning process as an alternative to employing the halogen-oxygen-containing solvent or other softening agent solely in the coagulating medium or in a treatment medium applied subsequent to coagulation, such agent may be contained in the spinning solution from which the filaments, threads, ribbons, films or other materials are to be produced. Similarly the new type of softening agent may be contained both in the spinning solution and in the coagulating medium or subsequent treatment medium. In wet spinning processes it is sometimes advantageous from the point of view of recovery of the constituents of the coagulating medium to employ the same solvent or solvent mixture for making up the spinning solution as that employed in the bath to confer upon it the desired softening action. Thus, for instance, a solution of cellulose acetate in a mixture of chloral hydrate and dioxane may be spun into an aqueous solution containing chloral hydrate and dioxane.

As previously indicated, the most important application of the new type of softening agent in the production or treatment of filaments or like materials in the present invention is for the purpose of applying to the materials a stretch. The amount of stretching may vary with the particular object in view. If the sole object is to vary the denier of the materials then the stretch applied will be adjusted in accordance with the required reduction of denier. For obtaining products of high tenacity it is preferable to apply a considerable amount of stretch to the materials. Thus, the stretch may be 50, 100, 200 up to 500% or even 1000% or more of the original length of the materials under treatment. The stretch may be inserted in a single stage or in two or more stages. In considering the stretch as applied to wet spinning processes the stretch is reckoned as the ratio of the winding speed to the extrusion speed of the spinning solution through the spinnerets or nozzles. The stretching of already formed yarns or threads is most advantageously effected with the yarns or threads in "warp formation", i. e. a large number of yarns or threads in the form of a sheet or warp treated as a whole.

The stretching, whether in a wet spinning process or in a process applied subsequently to the actual production of the materials may be operative from the nozzle or the point of let-off of the materials, but better results may be obtained by preventing the whole stretch from being incident upon the materials from the point of their extrusion from the spinning nozzles or from the point of let-off, and limiting it substantially to the portion of the materials which is either sufficiently coagulated or sufficiently softened to be in a plastic condition. Thus, for instance, resistances such as rollers, forks, guides or the like may be inserted in the path of the materials under treatment so as to prevent either a part or practically the whole of the tension producing the stretch from acting upon the materials in front of the resistances.

While, as previously stated, the invention particularly contemplates the employment of the halogen-oxygen-containing type of softening agent in processes in which stretching takes place, the invention is not limited thereto, but comprises quite broadly the treatment of filaments, threads, yarns, ribbons, films and other materials of cellulose acetate or other organic derivative of cellulose with this type of agent. Thus, this type of softening agent alone or in admixture with another softening agent may be used in a wet spinning process wherein substantial stretching of the materials during production is avoided. Again, in the treatment of finished materials the type of softening agent characteristic of the invention may be employed to bring about a shrinkage of the material under treatment so as to increase its extensibility or elasticity. Such a treatment may also be applied to fabrics containing the filaments or other materials so as to obtain a fabric possessing springiness to a high degree. In the treatment of filaments, threads and the like, not in fabric form, for the purpose of increasing the extensibility, this particular application of the invention is especially advantageous when applied to filaments or other materials which have been stretched very considerably either during or subsequent to their manufacture and which have a relatively low extensibility.

The following examples illustrate the wet spinning processes in accordance with the present invention:—

*Example 1*

A 25% acetone solution of cellulose acetate is spun into a bath consisting of

|  | Percent by weight |
|---|---|
| Chloral hydrate | 10 |
| Dioxane | 35 |
| Water | 55 |

Example 2

A 25% acetone solution of cellulose acetate is spun into a bath consisting of

| | Percent |
|---|---|
| Chloretone | 5 |
| Diacetone alcohol | 47.5 |
| Water | 47.5 |

Example 3

A 26% solution of cellulose acetate in acetone is spun into a 29% by weight aqueous solution of chloral hydrate.

In all these examples a considerable stretch may be applied to the materials.

The following example illustrates the application of the invention to the stretching of finished filaments.

Example 4

A sheet of yarns of cellulose acetate filaments arranged in the form of a warp is passed through a bath consisting of

| | Percent |
|---|---|
| Chloretone | 5 |
| Dioxane | 47.5 |
| Water | 47.5 | and is stretched while in the bath to 350% of its original length.

The invention is of particular importance in the production and treatment of filaments, yarns, ribbons, films or other materials made of cellulose acetate, but may also be applied with valuable results to the production and treatment of other cellulose esters or ethers, mixed esters, mixed ethers or mixed ether-esters, for example cellulose formate, cellulose propionate, cellulose butyrate, cellulose acetate propionate and cellulose nitroacetate, methyl, ethyl, butyl or benzyl cellulose, ethyl cellulose acetate or oxy-ethyl cellulose acetate.

What we claim and desire to secure by Letters Patent is:—

1. In a process for the manufacture of artificial filaments, threads, yarns, ribbons, films and like products having a basis of organic derivative of cellulose material, the step of changing the dimensions of said products while they are maintained in a sufficient plastic state to undergo the desired change with the aid of a lower aliphatic compound containing more than one chlorine atom and containing oxygen in the form of a group selected from the class consisting of alcoholic, ketonic, ester and hydroxy groups.

2. In a process for the production by wet spinning processes of artificial filaments, threads, yarns, ribbons, films and like products having a basis of organic derivative of cellulose material, the step of coagulating the shaped products with the aid of a lower aliphatic compound containing more than one chlorine atom and containing oxygen in the form of a group selected from the class consisting of alcoholic, ketonic, ester and hydroxy groups.

3. In a process for the treatment of artificial filaments, threads, yarns, ribbons, films and like products having a basis of organic derivative of cellulose material, the steps of softening said products with the aid of a lower aliphatic compound containing more than one chlorine atom and containing oxygen in the form of a group selected from the class consisting of alcoholic, ketonic, ester and hydroxy groups, and stretching the products while they are in the softened condition.

4. Process for the treatment of artificial filaments, threads, yarns and like products having a basis of cellulose acetate material, which comprises softening said products with the aid of chloretone, and stretching the products in the softened condition.

5. Process for the treatment of artificial filaments, threads, yarns and like products having a basis of cellulose acetate material, which comprises softening said products with the aid of chloral hydrate, and stretching the products in the softened condition.

6. Process for the production of artificial filaments, threads, yarns and like products, which comprises extruding a solution of cellulose acetate in acetone into aqueous coagulating bath containing dioxane and chloral hydrate, and continuously drawing the set products out of the bath at a speed greater than that of extrusion.

7. Process for the production of artificial filaments, threads, yarns and like products, which comprises extruding a solution of cellulose acetate in acetone into an aqueous coagulating bath containing dioxane and chloretone, and continuously drawing the set products out of the bath at a speed greater than that of extrusion.

8. Process for the treatment of artificial filaments, threads, yarns, ribbons, films and like products having a basis of cellulose acetate, which comprises shrinking said products with the aid of chloral hydrate.

9. Process for the treatment of artificial filaments, threads, yarns, ribbons, films and like products having a basis of cellulose acetate, which comprises shrinking said products with the aid of chloretone.

WILLIAM ALEXANDER DICKIE.
PERCY FREDERICK COMBE SOWTER.